(12) United States Patent
Ito et al.

(10) Patent No.: US 12,454,271 B2
(45) Date of Patent: Oct. 28, 2025

(54) OPERATION MANAGEMENT AID SYSTEM AND OPERATION MANAGEMENT AID METHOD

(71) Applicant: LOGISTEED, LTD., Tokyo (JP)

(72) Inventors: Nao Ito, Tokyo (JP); Takeshi Tanaka, Tokyo (JP); Shunsuke Minusa, Tokyo (JP); Hiroyuki Kuriyama, Tokyo (JP); Kiminori Sato, Tokyo (JP)

(73) Assignee: LOGISTEED, LTD., Tokyo (JP)

( * ) Notice: Subject to any disclaimer, the term of this patent is extended or adjusted under 35 U.S.C. 154(b) by 75 days.

(21) Appl. No.: 18/566,244

(22) PCT Filed: May 26, 2022

(86) PCT No.: PCT/JP2022/021596
§ 371 (c)(1),
(2) Date: Dec. 1, 2023

(87) PCT Pub. No.: WO2022/259881
PCT Pub. Date: Dec. 15, 2022

(65) Prior Publication Data
US 2024/0286620 A1    Aug. 29, 2024

(30) Foreign Application Priority Data
Jun. 8, 2021    (JP) ................. 2021-095970

(51) Int. Cl.
*B60W 40/08*    (2012.01)
*B60W 50/00*    (2006.01)
*B60W 50/14*    (2020.01)

(52) U.S. Cl.
CPC ........ *B60W 40/08* (2013.01); *B60W 50/0097* (2013.01); *B60W 50/14* (2013.01);
(Continued)

(58) Field of Classification Search
CPC .. B60W 40/08; B60W 50/0097; B60W 50/14; B60W 2050/0083; B60W 2050/146; B60W 2540/221; B60W 2556/20
See application file for complete search history.

(56) References Cited

U.S. PATENT DOCUMENTS 10,832,068 B2 * 11/2020 Schmidt ............... G06V 20/597
11,254,319 B2 *  2/2022 Iwase .................. G06V 20/597
(Continued)

FOREIGN PATENT DOCUMENTS

JP    2007-171154 A    7/2007
JP    2008-126818 A    6/2008
(Continued)

OTHER PUBLICATIONS

International Search Report, PCT/JP2022/021596, Aug. 9, 2022.

*Primary Examiner* — Mohamed Barakat
(74) *Attorney, Agent, or Firm* — Volpe Koenig

(57) ABSTRACT

An operation management aid system can access a first group of associated data in which biological measurement data pertaining to a biology of a driver is associated with task state data pertaining to a task state of the driver, and a second group of danger determination results indicating a degree of danger of driving by the driver, and wherein a processor executes: acquiring, the associated data pertaining to a specific task state of the driver from the first group, and acquiring a specific danger determination result group in the specific task state of the driver from the second group; and using an associated data group pertaining to the specific task state and a specific danger determination result group for the specific task state, to generate, for each of the specific task states, an estimation model that estimates an accident risk of the driver during the specific task state.

11 Claims, 14 Drawing Sheets

(52) U.S. Cl.
CPC .............. *B60W 2050/0083* (2013.01); *B60W 2050/146* (2013.01); *B60W 2540/221* (2020.02); *B60W 2556/20* (2020.02)

(56) References Cited

U.S. PATENT DOCUMENTS

| | | | |
|---|---|---|---|
| 2008/0119994 A1 | 5/2008 | Kameyama | |
| 2016/0052524 A1* | 2/2016 | Kim | B60W 40/09 340/576 |
| 2018/0345985 A1* | 12/2018 | Lindelöf | B60W 40/09 |
| 2019/0308656 A1* | 10/2019 | Shin | B60W 40/105 |
| 2020/0353925 A1* | 11/2020 | Kim | B60W 40/08 |
| 2021/0031807 A1* | 2/2021 | Yamamoto | B60W 60/0057 |
| 2022/0289250 A1* | 9/2022 | Oba | G08G 1/16 |
| 2023/0211780 A1 | 7/2023 | Tanaka et al. | |

FOREIGN PATENT DOCUMENTS

| | | |
|---|---|---|
| WO | 2020/225956 A1 | 11/2020 |
| WO | 2021/251351 A1 | 12/2021 |

* cited by examiner

OPERATION MANAGEMENT AID SYSTEM AND OPERATION MANAGEMENT AID METHOD

CLAIM OF PRIORITY

The present application claims priority from Japanese patent application No. 2021-095970 filed on Jun. 8, 2021, the content of which is hereby incorporated by reference into this application.

TECHNICAL FIELD

The present invention relates to an operation management aid system and an operation management aid method that aid operation management.

BACKGROUND

In recent years, traffic accidents involving commercial vehicles that travel long distances such as logistics trucks and night buses resulting from driver fatigue are considered as a social problem. In order to prevent such traffic accidents in advance, there is increasing use of technologies for monitoring the health of a driver currently engaged in driving, using biological data acquired from biological sensors.

In particular, there has been development of technology by which the autonomic nerve function (ANF) is estimated through time-frequency domain analysis at a given time interval according to the heartbeat interval, the estimated ANF is analyzed to estimate the health and degree of fatigue of the driver, and furthermore, to estimate the risk of an accident resulting from such causes, and the estimation results are issued as feedback to the driver or a manager. Currently, many technologies are under development in which the biological data is measured and analyzed under the presumption that a given condition is continuously occurring, such as rest or driving.

Patent literature 1 discloses a user hospitality system for an automobile, capable of detecting states of a user, and automatically controlling the action of on-vehicle devices in such a mode as is most desired, or is taken as most desired, by the user based on the results of detection. In the user hospitality system, action contents of a hospitality action part vary in accordance with contents of user living body characteristics information, so that service (hospitality) effect to the service in using the automobile is further corrected in accordance with mental or physical states of the user. More specifically, reference information in action control to functions specified by function extraction matrix is extracted, and physical or mental states represented by the user living body characteristics information separately obtained are added to the reference information, thereby correcting action contents of selected functions.

CITATION LIST

Patent Literature

PATENT LITERATURE 1: JP 2008-126818 A

SUMMARY OF INVENTION

Technical Problem

In applying the technique of Patent literature 1 to a case in which the accident risk is estimated and then issued as feedback, an example of such a case is one in which the scene is "driving," the physical/mental condition of the user is "drowsy," and the goal during driving includes "sleep prevention (safety improvement)." In this case, among the plausible types of accidents, it is possible to reduce the risk of falling asleep at the wheel.

However, causes for accidents that a driver of a commercial vehicle could encounter include not only drowsiness but also reduced concentration, excitement, and excessive nervousness, even when limited to the biological state of the driver. Other types of accidents include those caused by inattentive driving and rushed driving. Additionally, multiple biological factors could result in accidental or dangerous situations. Thus, it is difficult to clearly discern the causal relationship between each biological factor and the accident. Therefore, with the technique of JP 2008-126818 A, even if the goals and items for the estimated physical/mental condition of the driver were set in detail, it would be difficult to estimate the accident risk and issue feedback regarding the same.

An object of the present invention is to enable estimation of accident risk corresponding to a plurality of different situations.

Solution to Problem

An aspect of the disclosure in the present application is an operation management aid system, comprising: a processor that executes a program; and a storage device that stores the program, wherein the processor can access a first group of associated data in which biological measurement data pertaining to a biology of a driver is associated with task state data pertaining to a task state of the driver, and a second group of danger determination results indicating a degree of danger of driving by the driver, and wherein the processor executes: a first acquisition process of acquiring, for each of the task states, the associated data pertaining to a specific task state of the driver from the first group, and acquiring a specific danger determination result group in the specific task state of the driver from the second group; and a generation process of using an associated data group pertaining to the specific task state and a specific danger determination result group for the specific task state, which were acquired during the first acquisition process, to generate, for each of the specific task states, an estimation model that estimates an accident risk of the driver during the specific task state, and saving the estimation model in a third group.

Effects of Invention

According to a representative embodiment of the present invention, it is possible to enable estimation of accident risk corresponding to a plurality of different situations. Other objects, configurations, and effects than those described above are clarified by the following description of an embodiment.

DETAILED DESCRIPTION OF THE EMBODIMENTS

Embodiments of the present invention will be explained below with reference to the drawings.

Embodiment 1

<System Configuration Example>

Figure 1:
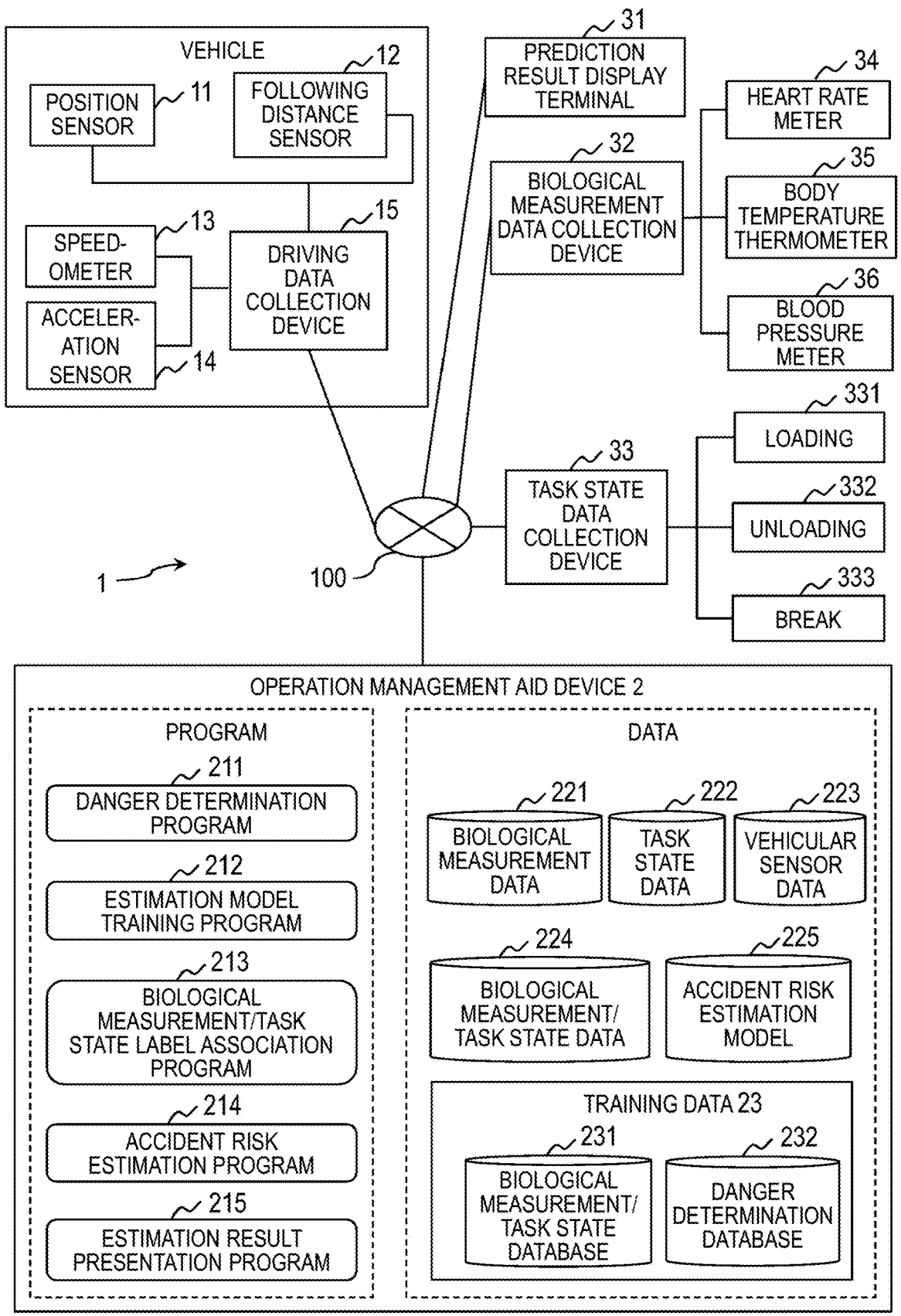
FIG. 1 is a descriptive view showing a system configuration example of an operation management aid system.

FIG. 1 is a descriptive view showing a system configuration example of an operation management aid system. An operation management aid system 1 includes at least an operation management aid device 2, among a group including a vehicle V, the operation management aid device 2, a driving data collection device 15, a prediction result display terminal 31, a biological measurement data collection device 32, and a task state data collection device 33. The vehicle V, the operation management aid device 2, the driving data collection device 15, the prediction result display terminal 31, the biological measurement data collection device 32, and the task state data collection device 33 can communicate with each other via a network 100.

The vehicle V includes a position sensor 11, a following distance sensor 12, a speedometer 13, an acceleration sensor 14, and the driving data collection device 15. The position sensor 11, the following distance sensor 12, the speedometer 13, and the acceleration sensor 14 are examples of sensor devices (in-vehicle sensors) installed in the vehicle V. The position sensor 11 measures the current position of the vehicle using a global navigation satellite system (GNSS). The following distance sensor 12 detects the following distance from a vehicle traveling to the front of the host vehicle. The speedometer 13 detects the travel speed of the vehicle V. The acceleration sensor 14 detects the acceleration of the vehicle V.

The driving data collection device 15 is installed in the vehicle V, acquires measurement data of the vehicular sensors of the vehicle V, and transmits the data to the driving data collection device 2. The driving data collection device 15 may be installed outside of the vehicle V, and transmit data from the vehicular sensors via the network 100.

The prediction result display terminal 31 displays estimation results by the operation management aid device 2 regarding the risk that the driver will experience an accident while driving (hereinafter, "accident risk"). Details regarding the estimation method for the accident risk, the display image for the prediction results, and the like will be described later.

The biological measurement data collection device 32 acquires measurement data of the driver from biological measurement devices and transmits the data to the driving data collection device 2. The biological measurement devices used in the example of FIG. 1 include, for example, a heart rate meter 34, a body temperature thermometer 35, and a blood pressure meter 36. The driver or manager measures the biological data of the driver using the biological measurement device before the start of duties for the day, during driving duties, during duties other than driving, and after the end of duties, for example.

The task state data collection device 33 acquires the tasks that were actually performed by the driver in association with the date and time as task state data and transmits the task state data to the operation management aid device 2. The driver may, for example, input the tasks of the day to the task state data collection device 33 after the end of duties for the day.

Alternatively, the task state data collection device 33 may estimate the flow of the task states of the driver according to the driving data acquired by the driving data collection device 15 and use the estimated flow as task state data. Alternatively, the task state data collection device 33 may collect action data of the driver such as the acceleration and position information of the driver, and footage captured of the driver while performing tasks from the biological measurement data collection device 32, estimate the flow of the task states according to the collected action data, and use the estimated flow as the task state data.

Loading 331, unloading 332, and break 333 are input means installed at the driver seat of the vehicle V, namely buttons operated by the driver, for example. If, while the vehicle V is stopped, any of the buttons for loading 331, unloading 332, and break 333 is pressed, the task state data collection device 33 collects data indicating a pressed state. Here, time information including the button press time may be acquired. While the vehicle V is in motion, the task state data collection device 33 collects data indicating that the vehicle V is in motion.

The operation management aid device 2 stores a plurality of programs that perform processing and data to be processed by the plurality of programs. The programs executed by the operation management aid device 2 include a danger determination program 211, an estimation model training program 212, a biological measurement/task state label association program 213, an accident risk estimation program 214, and an estimation result presentation program 215.

The data stored by the operation management aid device 2 includes biological measurement data 221, task state data 222, vehicular sensor data 223, biological measurement/task state data 224, accident risk estimation model 225, and training data 23. The training data 23 specifically includes a biological measurement/task state database 231 and a danger determination database 232.

The biological measurement data 221 is measured biological data of the driver. The biological measurement data 221 includes, for example, biological data measured during tasks including driving duties, biological data measured in a state of not performing tasks, such as standing by or being on break, or a combination of some or all of the foregoing.

The task state data 222 is data indicating the state of specific tasks that the driver experienced while working. Examples of such tasks specifically include driving, loading, unloading, standing by, and being on break. Tasks such as driving, loading, and unloading may be categorized even more specifically depending on the type of road traveled, the region of travel, the type of articles transported, and the like.

The biological measurement/task state data 224 is data generated from the biological measurement data 221 and the task state data 222 by the biological measurement/task state label association program 213. The biological measurement/task state data 224 is data by which it is possible to ascertain, for the same driver on the same day, the tasks that the driver was performing at times when respective biological data values were measured. Specifically, the biological measurement/task state data 224 is data in which the biological measurement data 221 and the task state data 222 are associated with each other at each time, for example.

The vehicular sensor data 223 is data used by the danger determination program 211. The vehicular sensor data 223 is data pertaining to the driving operations, vehicular movements, position information, or the like received from the driving data collection device 15.

The accident risk estimation model 225 is a model that is executed by the accident risk estimation program 214 and uses the biological measurement/task state data 224 for estimating the accident risk, which is the risk that the driver experiences an accident. The accident risk estimation model 225 is present for each type of task state label 502 within the biological measurement/task state data 224. Additionally, the accident risk estimation model 225 may be present for each time period and for each type of task state label 502.

The training data 23 is data used by estimation model training program 212. The biological measurement/task state database 231 in the training data 23 includes the biological measurement/task state data 224 acquired in the past. The danger determination database 232 includes data acquired by the danger determination program 211 and the vehicular sensor data 223. The data indicates whether the driving in the situations measured by past biological measurement/task state data 224 was determined to be dangerous.

The danger determination program 211 is a program for determining whether the driving by the driver is dangerous. The determination by the danger determination program 211 as to whether the driving was dangerous can be made by any technique, and the standards thereof are dependent on design. Examples of driving determined to be dangerous include hard braking, hard acceleration, exceeding the legal speed limit, following too closely, and the like.

The danger determination program 211 determines various dangerous driving operations according to the vehicular sensor data 223 (measured data of the vehicular sensors). For example, whether or not the braking or acceleration was too hard is determined according to data detected by the acceleration sensor 14, and whether or not the following distance is too close is determined from data detected by the following distance sensor 12. Whether or not the vehicle V is following the legal speed limit is determined according to data detected by the position sensor 11, map information (not shown), and data detected by the speedometer 13.

The danger determination data in the danger determination database 232 may be data indicating the degree of danger at the same point in time as each measurement time for the biological measurement/task state data 224, or may be data indicating the degree of danger at one or more points in time a few to a few dozen minutes after the measurement time for the biological measurement/task state data 224.

The danger determination program 211 analyzes the vehicular sensor data 223 transmitted from the driving data collection device 15 and determines whether each situation is dangerous. The biological measurement/task state label association program 213 associates the biological measurement data 221 transmitted from the biological measurement data collection device 32 with the task state data 222 transmitted from the task state data collection device 33 to generate the biological measurement/task state data 224. Details regarding the biological measurement/task state data 224 will be described later.

The accident risk estimation program 214 estimates the accident risk for the situation according to the biological measurement/task state data 224. The estimation result presentation program 215 presents the predicted accident risk of the driver and information associated therewith. The estimation model training program 212 uses the biological measurement/task state data 224 and the danger determination data from the danger determination program 211 to train an estimation model for each task state of the biological measurement/task state data 224.

<Hardware Configuration Example of Operation Management Aid Device 2>

Figure 2:
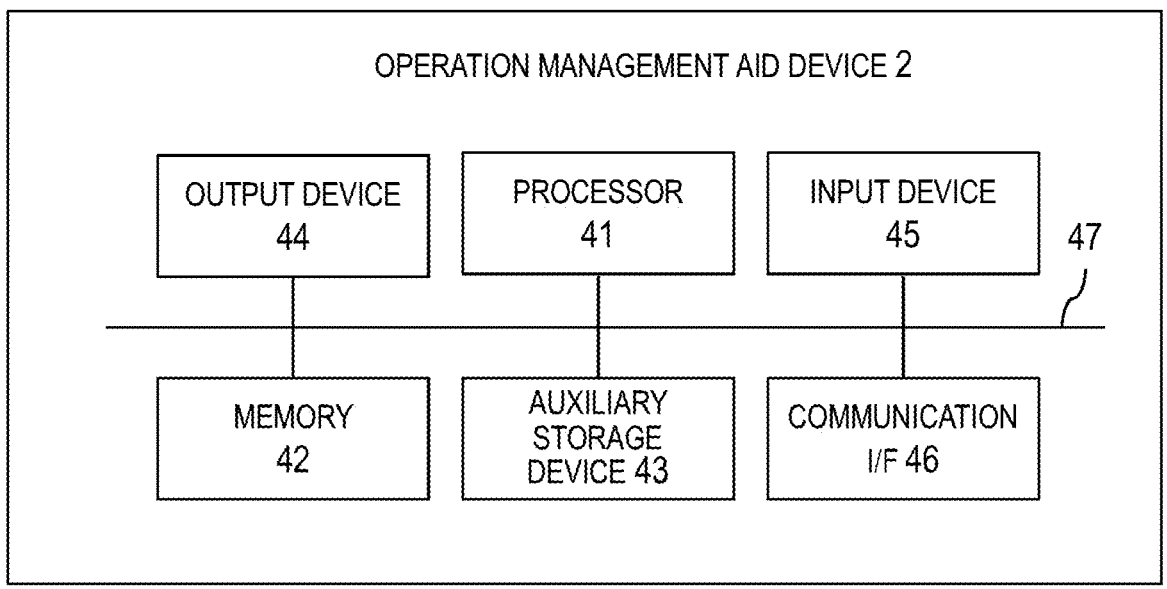
FIG. 2 is a block diagram for showing a hardware configuration example of the operation management aid device.

FIG. 2 is a block diagram for showing a hardware configuration example of the operation management aid device 2. The operation management aid device 2 includes a processor 41, a memory 42, an auxiliary storage device 43, an output device 44, an input device 45, and a communication interface (I/F) 46. These constituent elements are connected to each other by a bus 47. The memory 42, the auxiliary storage device 43, or a combination thereof is a storage device, and stores the programs and data indicated in FIG. 1.

The memory 42 is constituted of a semiconductor memory, for example, and is primarily used to store programs currently being executed and data. The processor 41 executes various processes according to programs stored in the memory 42. Various functional units are realized as a result of the processor 41 operating according to the programs. The auxiliary storage device 43 is constituted of a large capacity storage device such as a hard disk drive or a solid state drive, for example, and is used for long-term storage of programs and data.

The processor 41 can be constituted of one or more processing units, and can include one or more computation units or a plurality of processing cores. The processor 41 can be implemented as one or more central processing units, a microprocessor, a microcomputer, a microcontroller, a digital signal processor, a state machine, a logic circuit, a graphics processing unit, a system-on-a-chip, and/or a given device that operates signals on the basis of a control instruction.

The programs and data stored in the auxiliary storage device 43 are loaded to the memory 42 during start up or as necessary, and the programs are executed by the processor 41, thereby causing the various processes of the operation management aid device 2 to be executed. Thus, the processes executed by the operation management aid device 2 below are processes by the processor 41 or programs.

The input device 45 is a hardware device for the user to input instructions and information to the operation management aid device 2. The output device 44 is a hardware device for presenting various images for input and output, and is a display device or a printing device, for example. The communication I/F 46 is an interface for connecting to the network 100. The input device 45 and the output device 44 may be omitted, in which case the operation management aid device 2 may be accessed from a terminal via the network 100.

The functions of the operation management aid device 2 can be installed in a computer system constituted of one or more computers, each of which includes one or more processors and one or more storage devices that include a non-transitory storage medium. The plurality of computers can communicate via the network 100. A configuration may be adopted in which some of a plurality of functions of the operation management aid device 2 are installed in one computer and other functions are installed in another computer, for example.

The driving data collection device 15, the prediction result display terminal 31, the biological measurement data collection device 32, and the task state data collection device 33 can have a similar computer configuration to the operation management aid device 2. The functions of a plurality of devices in the above-mentioned device may be installed in one device, and the operation management aid device 2, the prediction result display terminal 31, and the biological measurement data collection device 32 may be combined in one device.

<Example of Processes Executed by Operation Management Aid Device 2>

Figure 3:
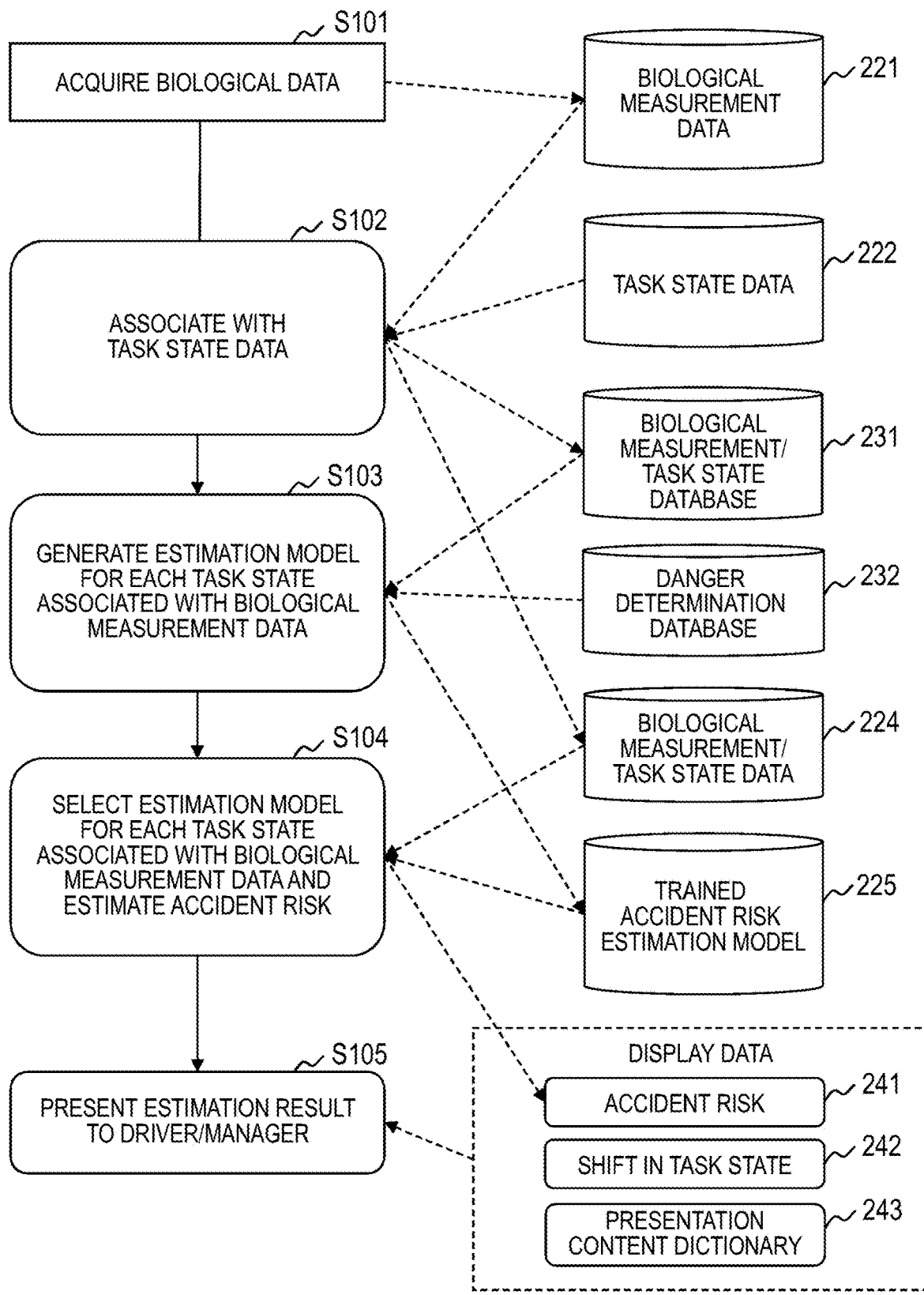
FIG. 3 is a flowchart of a series of processes from the acquisition of the biological measurement data by the opera

FIG. 3 is a flowchart of a series of processes from the acquisition of the biological measurement data 221 by the operation management aid device 2 to when the accident risk is estimated and the result thereof is presented. First, the operation management aid device 2 uses the biological measurement/task state label association program 213 to acquire various types of biological data and generate the biological measurement data 221 (step S101).

Next, the operation management aid device 2 uses the biological measurement/task state label association program 213 to convert, extract, and shape the biological measurement data 221 for input to the estimation model, associate the biological measurement data 221 with the task state data 222, and generate or update the biological measurement/task state database 231 (step S102).

Next, the operation management aid device 2 uses the estimation model training program 212 to generate an estimation model for each piece of task state data 222 associated with the biological measurement data 221 in order to improve estimation accuracy (step S103).

Then, the operation management aid device 2 uses the accident risk estimation program 214 to select an estimation model corresponding to the biological measurement/task state data 224 indicating the state of the driver, among the estimation model group for each piece of task state data 222 associated with the biological measurement data 221, thereby using the selected estimation model to estimate an accident risk 241 (step S104).

Lastly, the operation management aid device 2 uses the estimation result presentation program 215 to display or issue a notification of the estimation result (accident risk 241) and the shift in task state to the driver or a manager thereof (step S105). Below, details of the above-mentioned processes and details regarding data used in such processes will be explained.

<Data Configuration Example>

Figure 4:
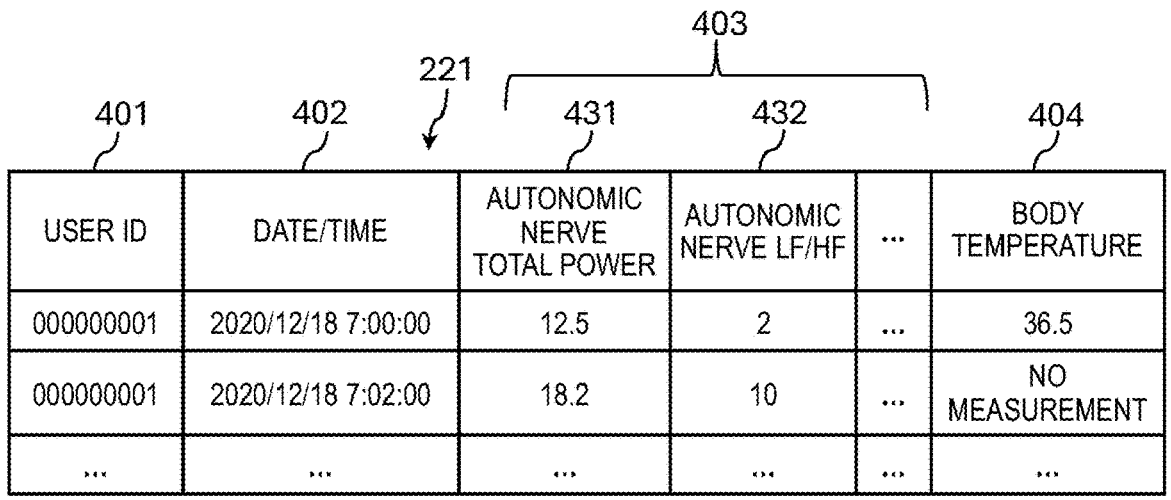
- FIG. 4 is a descriptive view showing a configuration example of the biological measurement data.

FIG. 4 is a descriptive view showing a configuration example of the biological measurement data 221. In the present embodiment, the heartbeat interval (RR) is used as the biological data, and the autonomic nerve function (ANF) index is used as the index of the biological measurement data 221. The biological measurement data 221 includes, as fields, a user ID 401, a date/time 402, an ANF index 403, and a body temperature 404. The ANF index 403 includes an autonomic nerve total power 431 and an autonomic nerve LF/HF 432, for example.

The user ID 401 is identification information that uniquely identifies each driver who is a user. The date/time 402 is the time at which measurement of the biological measurement data 221, acquired at a given time interval, was started. Here, the date/time 402 may be expressed as another single point in time or a combination of a plurality of points in time that serve as a standard for indicating the measurement time period other than the measurement start time such as the time at which measurement is ended or the median of a plurality of measurement times.

The autonomic nerve total power 431 indicates the total power (TP), which is one electrocardiogram parameter. The total power is of the power spectrum of a specific frequency band of the electrocardiogramiation, and pertains to fatigue. The autonomic nerve LF/HF 432 is a ratio of a low frequency band (LF) and a high frequency band (HF) in the specific frequency band, which is one electrocardiographic variation parameter. LF/HF is a value indicating the overall balance of sympathetic and parasympathetic nerves.

Other instances of the ANF index 403 include a time domain parameter, a frequency domain parameter, or a non-linear parameter using the heart rate or the RR interval of heartbeats. The time domain parameters using the heart rate or the RR include the average (Mean) and standard deviation (SDNN) of the RR interval measured as a set time interval such as two minutes, the coefficient of variation (CVRR), the root mean square of the difference between consecutive RR intervals (RMSDD), the total number of instances where the difference between consecutive RR intervals exceeds 50 ms (NN50), and the like.

The frequency domain parameters using the heart rate or the RR include, in addition to the total power and LF/HF, the VLF, which is the power spectrum at an ultra-low frequency band, LF, HF, or a deviation value of each of the foregoing; CCVVLF, CCVLF, or CCVHF, which are CVRR values of each frequency component; or the like. The non-linear parameters using the heart rate or the RR include, for example, a standard deviation SD1 of the vertical axis, a standard deviation SD2 of the horizontal axis, the area of a virtual ellipse, or the like, in a Poincaré plot, where the RR at a given point in time is plotted along the horizontal axis and the RR at the next point in time is plotted along the vertical axis. The body temperature 404 is a measurement value of the body temperature of the driver.

Figure 5:
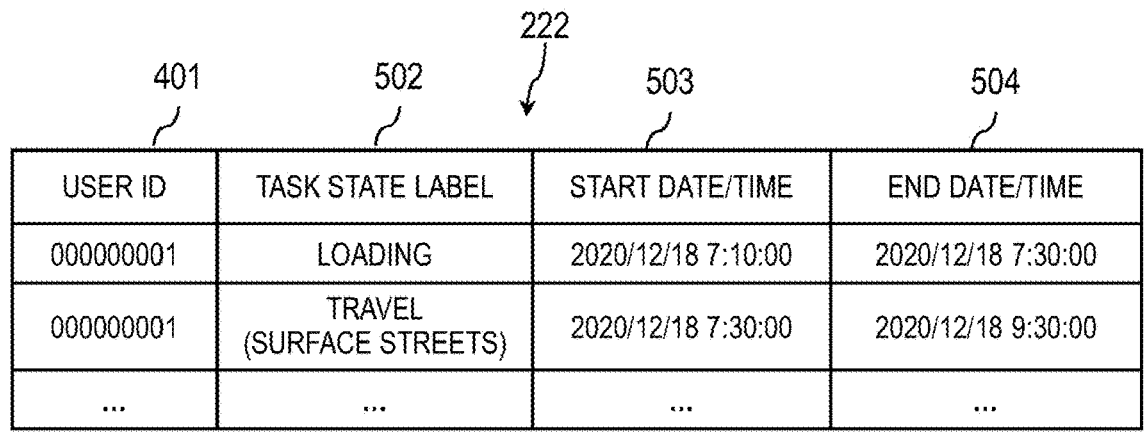
FIG. 5 is a descriptive view showing a configuration example of the task state data.

FIG. 5 is a descriptive view showing a configuration example of the task state data 222. The task state data 222 includes, as fields, the user ID 401, a task state label 502, a start date/time 503, and an end date/time 504. The task state label 502 is a label that specifies the task state indicating the tasks conducted by the driver while working. Specific examples of task states specified by the task state label 502 include "driving," "loading," "unloading," "standby," "break," and the like. Additionally, detailed content may be stored to indicate the type of road traveled, the name of the region traveled, and the like, as in the following examples: "driving (surface streets)," "driving (highway)," and "driving (Kanto region)." Also, detailed content may be stored by adding the state during travel such as "road congestion information," "weather information," and "sunshine information." The start date/time 503 and the end date/time 504 indicate the dates and times at which the task state label 502 of the same row is started and ended.

Figure 6:
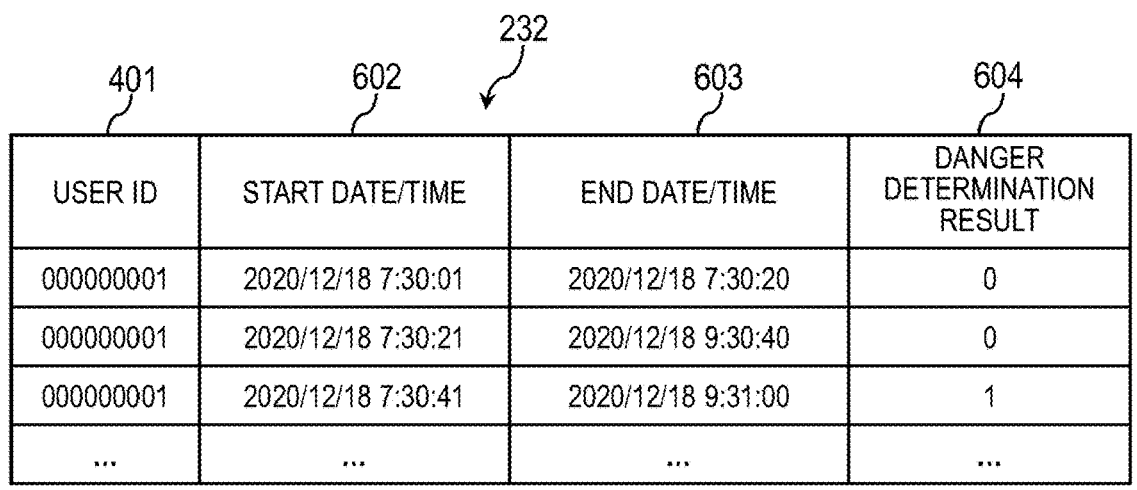
FIG. 6 is a descriptive view showing a configuration example of the danger determination database.

FIG. 6 is a descriptive view showing a configuration example of the danger determination database 232. The danger determination database 232 includes, as fields, a user ID 401, a start date/time 602, an end date/time 603, and a danger determination result 604. The start date/time 602 and the end date/time 603 indicate the dates and times at which the danger determination of each piece of relevant data is started and ended. The danger determination result 604 indicates the result of the danger determination program 211 estimating whether a dangerous situation occurred during the period between the start date/time 602 and the end date/time 603. Specifically, a numerical value expressing the degree of danger or a character string such as "dangerous" or "not dangerous" is stored, for example. The format of the danger determination result 604 is set to correspond to the format of the output result of the danger determination program 211.

<Acquisition Process for Biological Measurement/Task State Database 231 or Biological Measurement/Task State Data 224>

Figure 7:
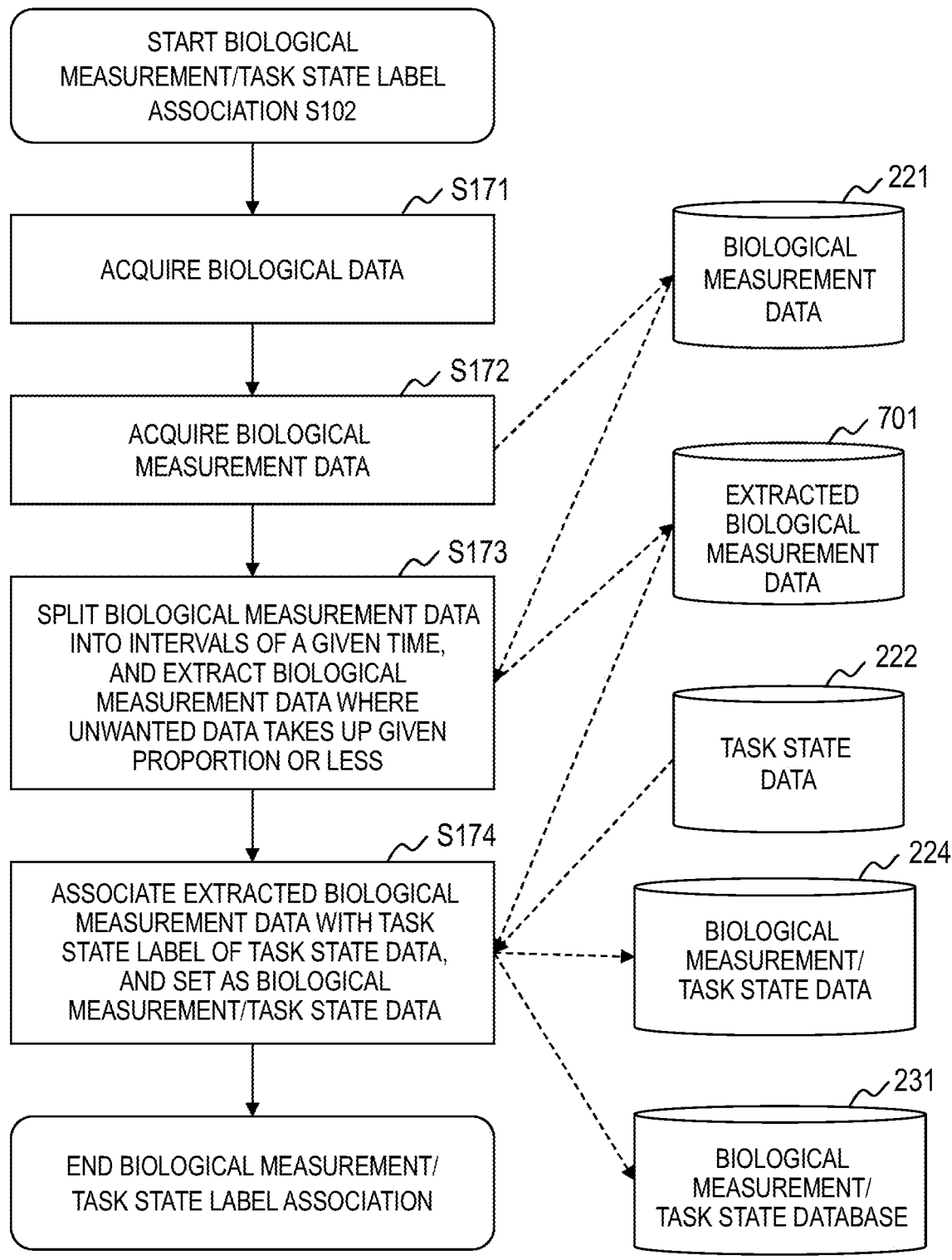
FIG. 7 is a flowchart showing an example of steps in the acquisition process of the biological measurement/task state database or the biological measurement/task state data.

FIG. 7 is a flowchart showing an example of steps in the acquisition process of the biological measurement/task state database 231 or the biological measurement/task state data 224 by the biological measurement/task state label association program 213. FIG. 7 shows an example of detailed process steps of step S102 shown in FIG. 3. The biological measurement/task state label association program 213 is executed when generating the biological measurement/task state database 231 used in training for generating or updating an estimation model, and when generating the biological measurement/task state data 224 used when estimating the accident risk using the estimation model.

The training data 23 used in training is data acquired from past drivers, and the biological measurement/task state database 231 is generated from the biological measurement data 221 and the task state data 222 acquired prior to the start of operations of the operation management aid device 2. Also, the training data 23 may be updated by, for example, adding data periodically extracted at the level of months or years from the biological measurement data 221 and the task state data 222 acquired after the start of operations of a safety operation system. In such a case, it would be necessary to also store the danger determination database 232 corresponding to the added biological measurement data 221 and task state data 222.

Also, the added biological measurement data 221, task state data 222, and danger determination database 232 (hereinafter referred to as "additional data") may be used outside of the operation management aid device 2 via the network 100. In such a case, consideration is made as whether a system developer may add the additional data to the training data 23 or conditions for exclusion from the additional data, and the additional data is added to the training data 23 according to the results of such consideration.

The present embodiment uses RR as the biological data. First, in the biological data acquisition process (step S171), the biological measurement data collection device 32 measures the RR of the driver and transmits the data to the operation management aid device 2. Specifically, the biological measurement data collection device 32 takes the electrocardiogram (heart rate) of the driver using the heart rate meter 34, for example. The biological measurement data collection device 32 detects the RR in the measurement results from the heart rate meter 34. The RR indicates the interval between peaks of a specific type.

Figure 8:
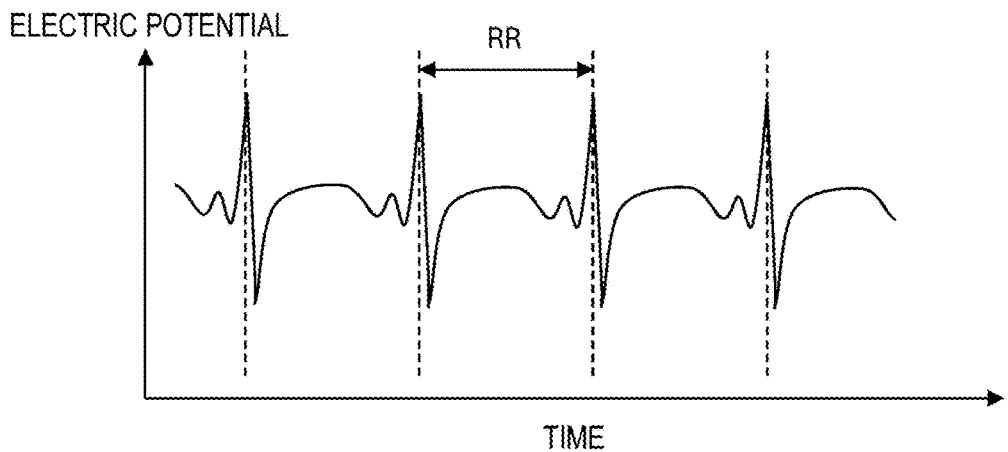
FIG. 8 is a graph showing an example of heartbeat variation.

FIG. 8 is a graph showing an example of heartbeat variation. In the graph of FIG. 8, the horizontal axis indicates time, and the vertical axis indicates the electric potential.

Figure 9:
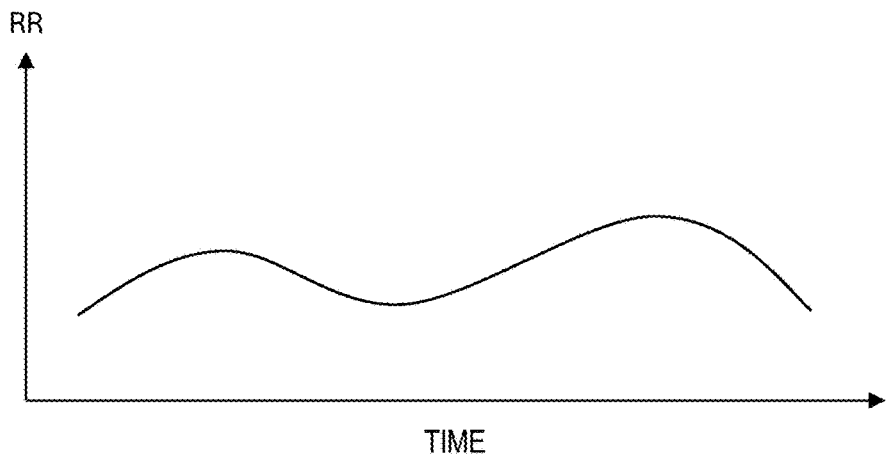
FIG. 9 is a graph showing a change over time in the RR.

FIG. 9 is a graph showing a change over time in the RR. In FIG. 7, in the subsequent biological measurement data acquisition process (step S172), the biological measurement data collection device 32 calculates the ANF index 403 from the RR as the biological measurement data 221. Here, an example will be described of a process for calculating the autonomic nerve total power 431 and the autonomic nerve LF/HF 432.

Figure 10:
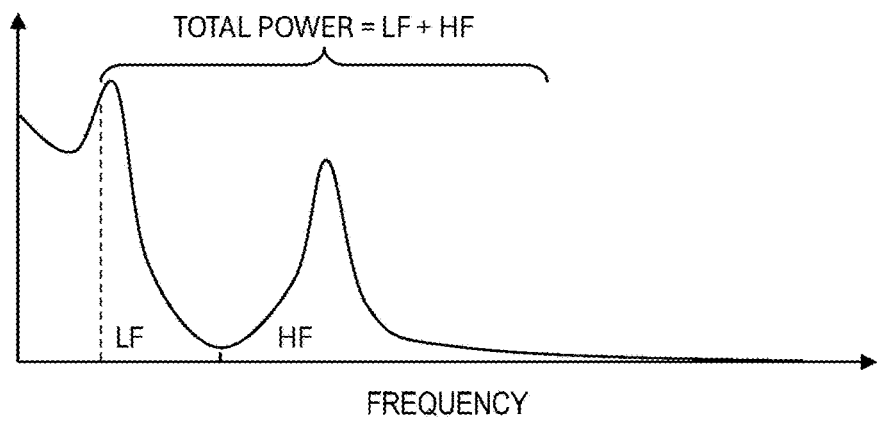
FIG. 10 is a graph showing an example of a frequency spectrum indicating the change over time in the RR.

FIG. 10 is a graph showing an example of a frequency spectrum indicating the change over time in the RR. In the graph of FIG. 10, the horizontal axis is the frequency, and the vertical axis is the spectral power density of the RR. The biological measurement data collection device 32 calculates the LF and HF from the frequency domain, and the sum thereof is calculated as TP and the result of dividing LF by HF is calculated as LF/HF. The biological measurement data collection device 32 transmits, to the operation management aid device 2, the calculated ANF index 403 as the biological measurement data 221 together with data acquired from other measurement instruments for body temperature, blood pressure, and the like.

Next, an example will be described in which data is processed by a process of extracting the biological measurement data 221 according to a condition (step S173), and a process of acquiring the biological measurement/task state data 224 or the biological measurement/task state database 231 (step S174).

Figure 11:
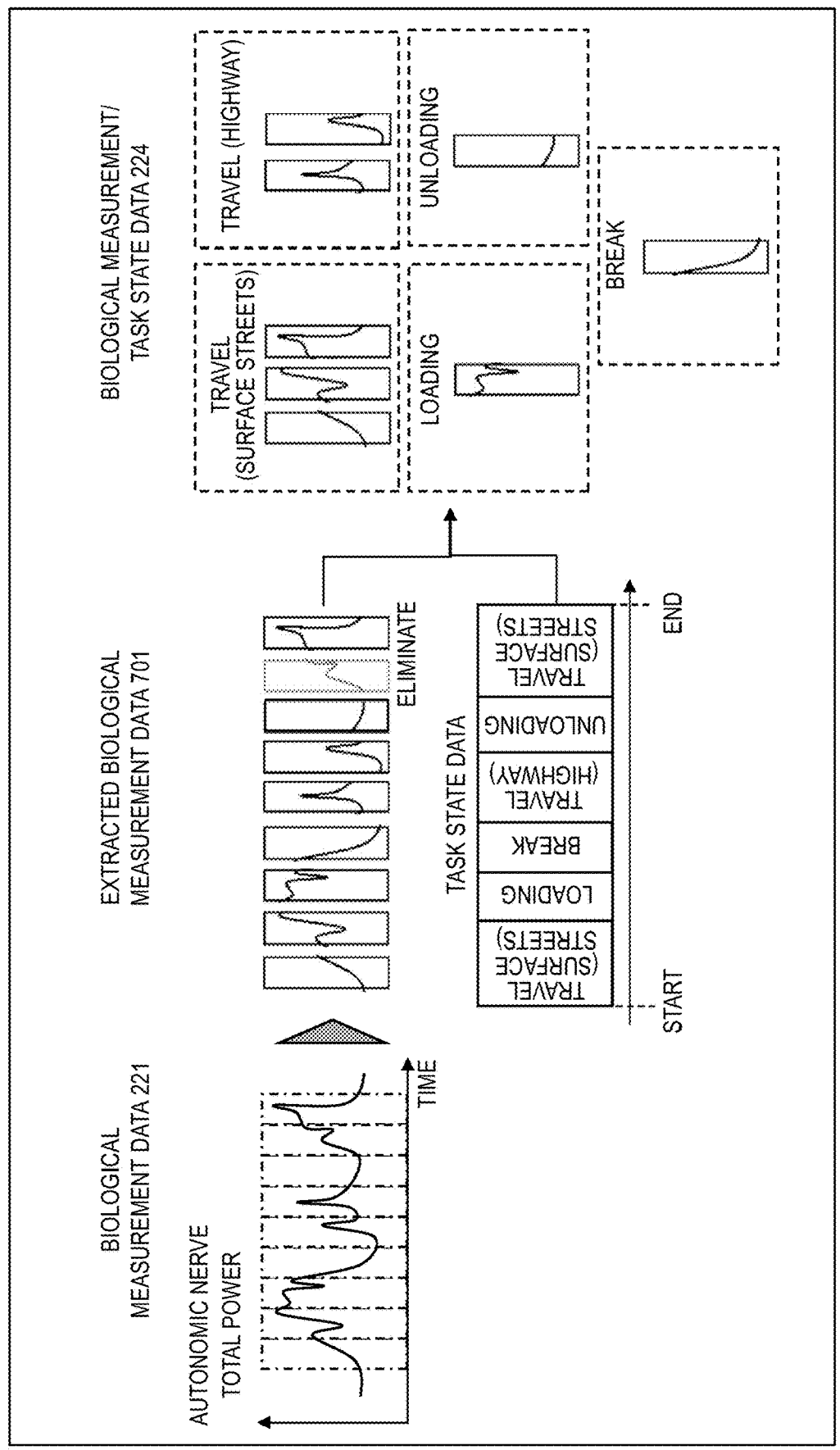
FIG. 11 is a descriptive view showing a processing example of acquiring the biological measurement/task state data from the biological measurement data and the task state data.

FIG. 11 is a descriptive view showing a processing example of acquiring the biological measurement/task state data 224 from the biological measurement data 221 and the task state data 222. In the process of extracting the biological measurement data 221 according to a condition (step S173), the operation management aid device 2 splits the received biological measurement data 221 into uniform time intervals such as two minutes. The biological measurement data 221 is split into uniform time intervals because the ANF index 403 within the biological measurement data 221 handled in the present embodiment is calculated from an index representing the temporal change in the RR. The uniform time interval is typically in a range of 30 seconds to around five minutes.

Next, the operation management aid device 2 calculates, for each of the split pieces of biological measurement data 221, the proportion including invalid data for analysis such as arrhythmias, measurement errors, and body movement noise, using basic statistical values such as the variance and percentiles of the biological measurement data 221, extracts only the split biological measurement data 221 where such basic statistical values fall below a given threshold, and designates these as extracted biological measurement data 701.

Next, in the process of acquiring the biological measurement/task state data 224 (step S174), the operation management aid device 2 ascertains the task state of the time period corresponding to the extracted biological measurement data 701 from the task state data 222 received from the task state data collection device 33, labels the extracted biological measurement data 701 with task states at the measurement times, and acquires the foregoing as biological measurement/task state data 224 or the biological measurement/task state database 231.

Figure 12:
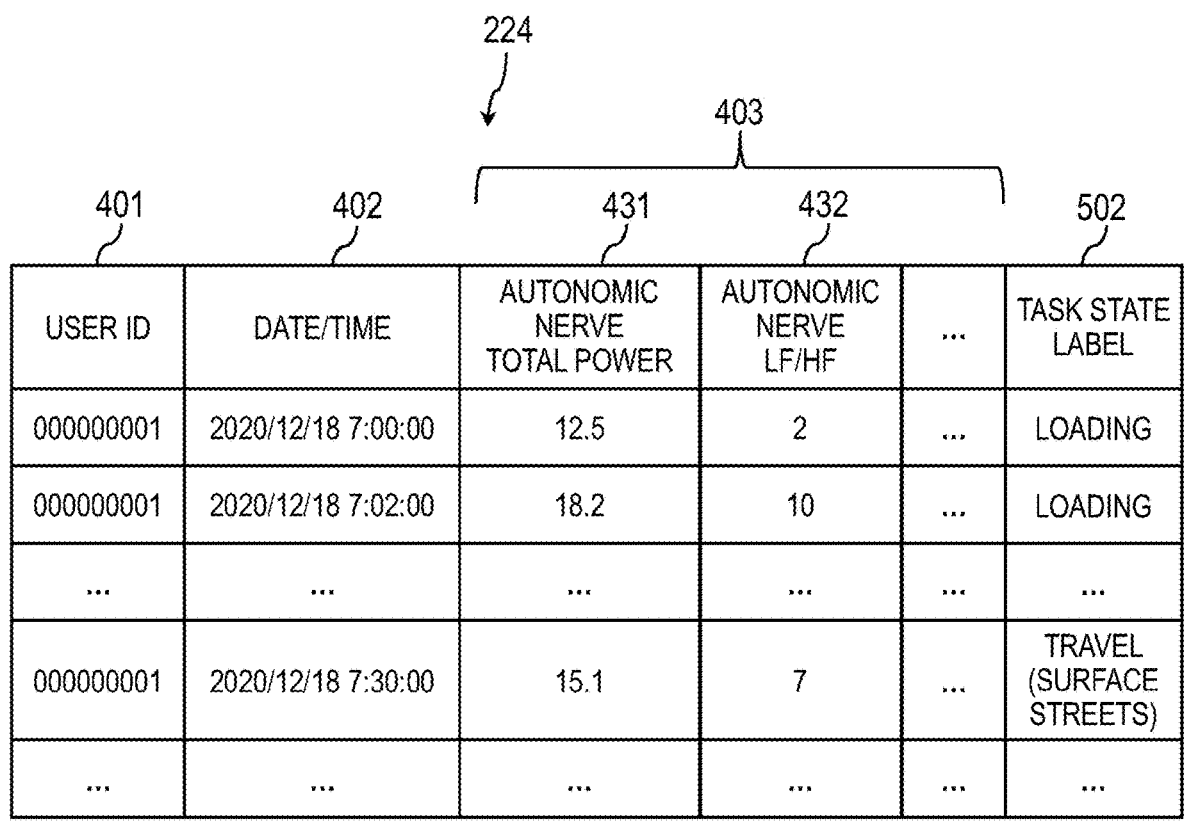
FIG. 12 is a descriptive view showing a configuration example of the acquired biological measurement/task state data.

FIG. 12 is a descriptive view showing a configuration example of the acquired biological measurement/task state data 224. Also, the date/time 402 of the biological measurement data 221 and the start date/time 503 and the end date/time 504 of the task state data corresponding to the date/time 402 may have a time offset within a given range. Since the purpose is the labeling of the biological measurement data 221, if a plurality of task state labels 502 are present within the measurement time indicated by the date/time 402 included in the extracted biological measurement data 701, then the operation management aid device 2 selects one task state label 502 corresponding to the extracted biological measurement data 701 according to a given rule.

Examples of such rules include "Adopt a task state label 502 recorded for a longer time within the task state data 222 corresponding to one piece of biological measurement data 221 in a given time period." If there is any data with missing task state labels 502, then possible processes include eliminating such data as invalid data from the biological measurement/task state data 224.

Figure 13:
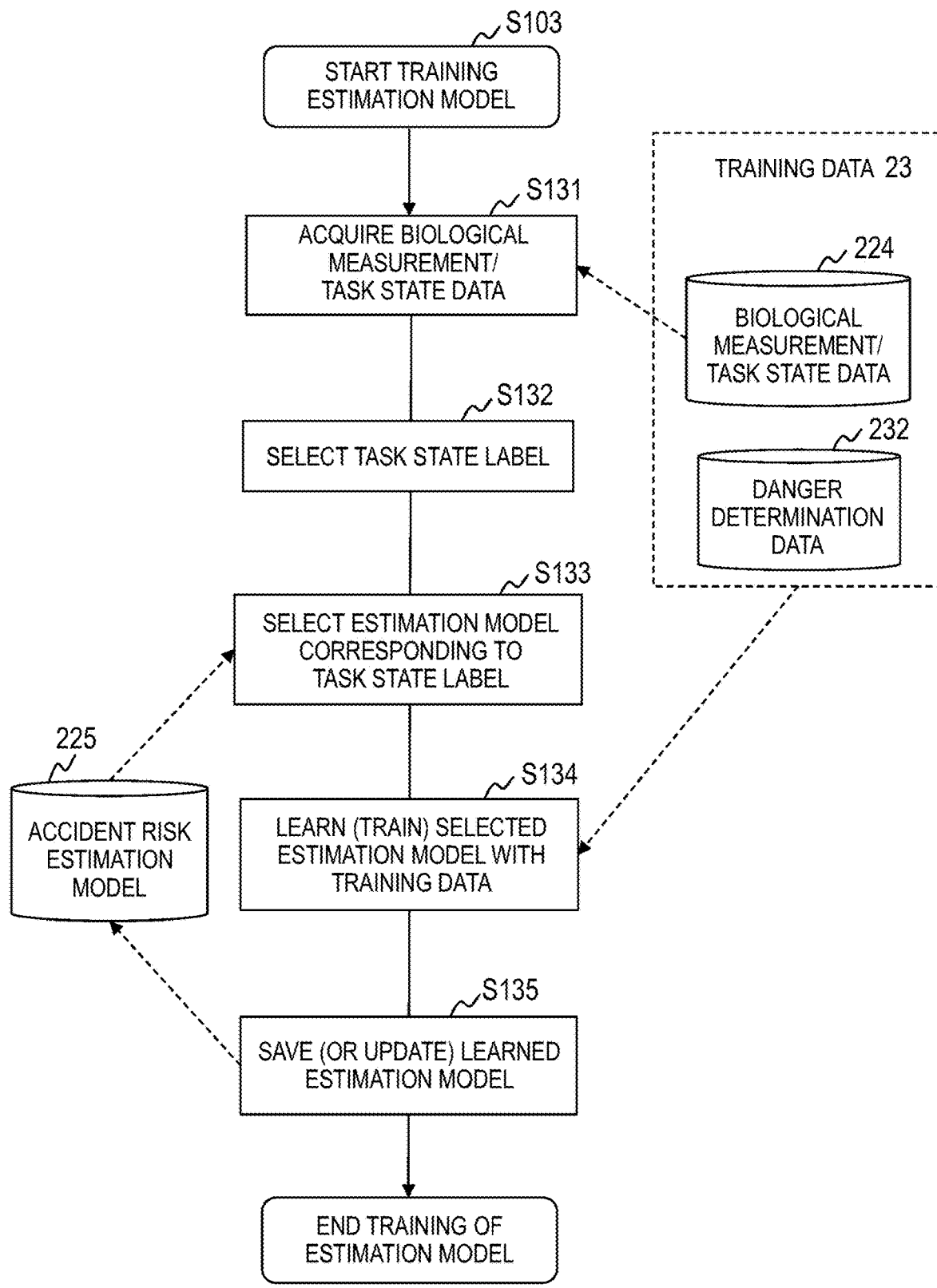
FIG. 13 is a flowchart showing an example of detailed process steps of the process of generating or updating the model for estimating the accident risk shown in FIG. 3 (step S103).
Figure 14:
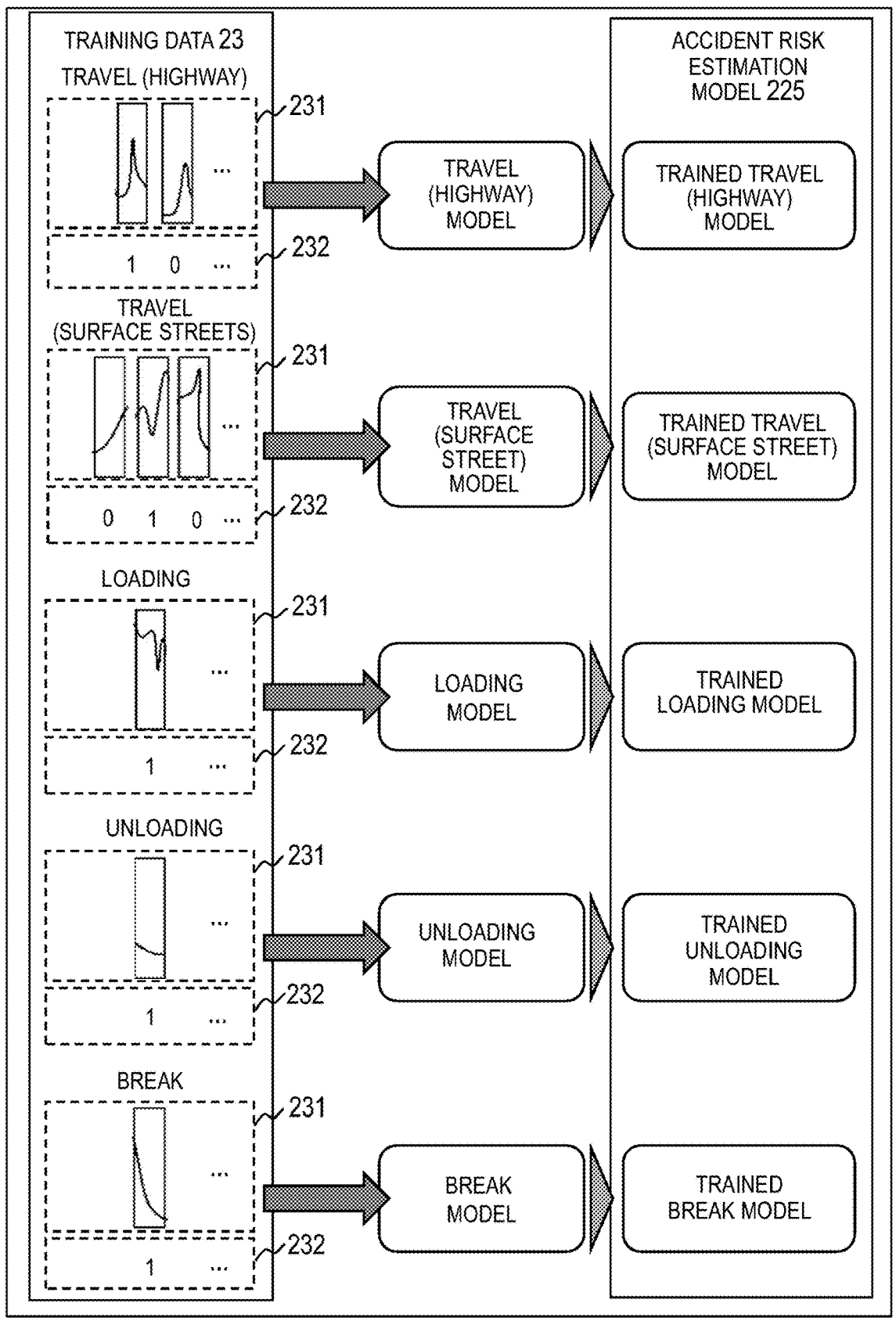
FIG. 14 is a descriptive view showing a training example for the estimation model using data divided for each task state label.

FIG. 13 is a flowchart showing an example of detailed process steps of the process of generating or updating the model for estimating the accident risk shown in FIG. 3 (step S103). FIG. 14 is a descriptive view showing a training example for the estimation model using data divided for each task state label 502. The operation management aid device 2 acquires biological measurement/task state data 224 from the biological measurement/task state database 231 (step S131), and selects the task state label 502 from the biological measurement/task state data 224 (step S132).

The operation management aid device 2 selects the accident risk estimation model 225 corresponding to the selected task state label 502 (step S225), trains the selected accident risk estimation model 225 using the training data 23 for each task state label 502 of the biological measurement/task state database 231 (step S134), and saves the trained accident risk estimation model 225 (step S135).

A case is assumed in which typically the estimation model training program 212 uses previously collected training data 23 and is executed prior to the start of operation of the operation management aid device 2, but if the training data 23 is updated after the start of operation of the operation management aid device 2, it is possible to update the accident risk estimation model by re-executing the estimation model training program 212. Additionally, coefficients and parameters stored in the accident risk estimation model 225 prior to updating may be recorded within or outside of the system as a backup prior to overwriting by the update.

Figure 15:
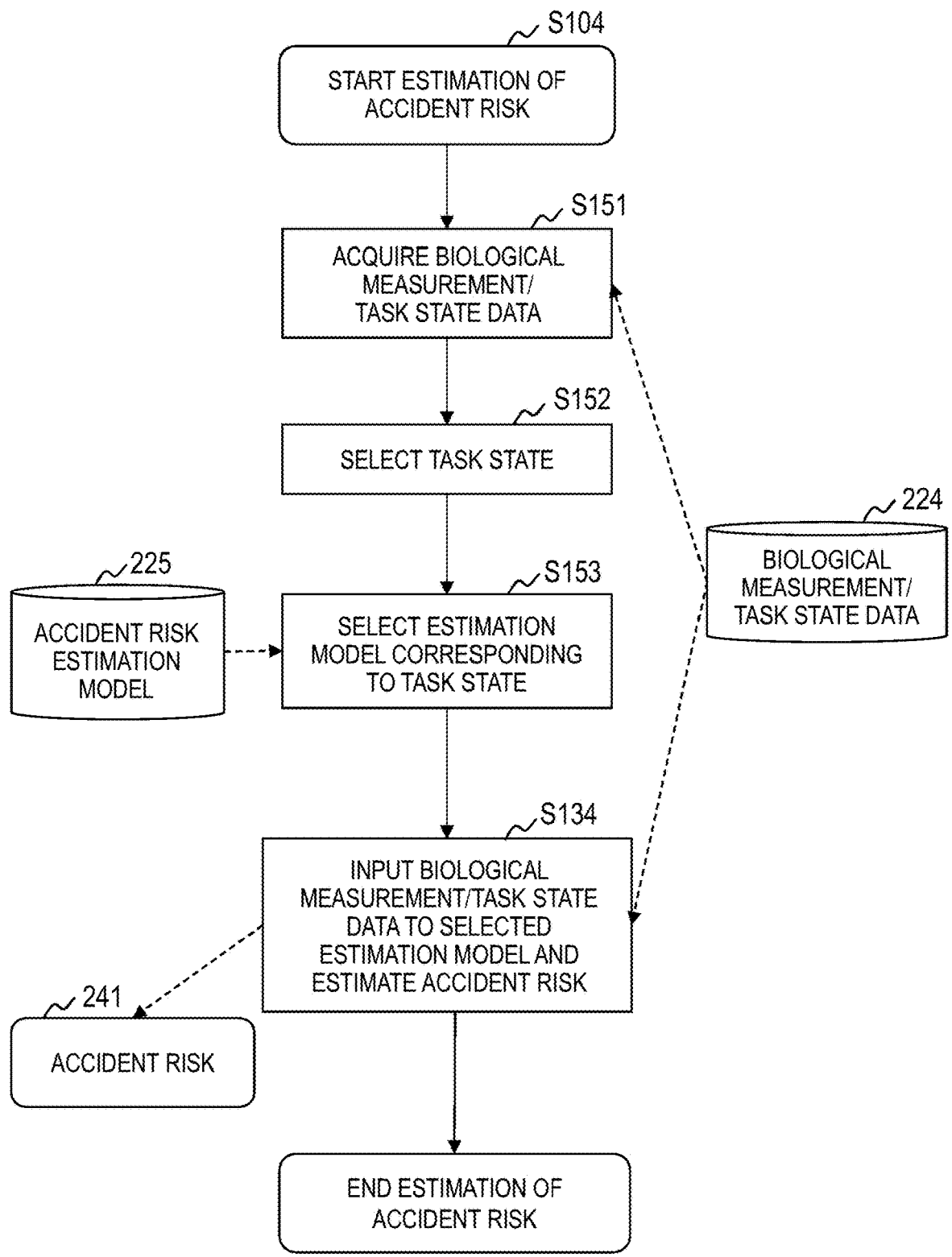
FIG. 15 is a flowchart showing an example of detailed process steps of the accident risk estimation process (step S104) executed by the accident risk estimation program shown in FIG. 3.
Figure 16:
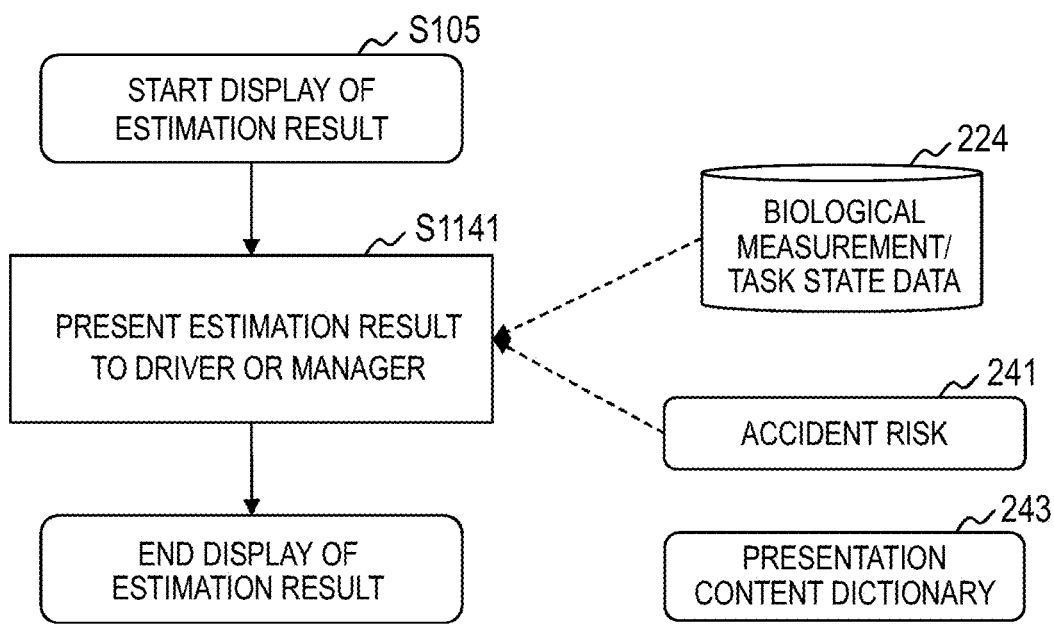
FIG. 16 is a flow chart showing an example of detailed process steps of the estimation result display process (step S105) shown in FIG. 3.

FIG. 15 is a flowchart showing an example of detailed process steps of the accident risk estimation process (step S104) executed by the accident risk estimation program 214 shown in FIG. 3. FIG. 16 is a flow chart showing an example of detailed process steps of the estimation result display process (step S105) shown in FIG. 3. In the estimation result display process (step S105), the operation management aid device 2 uses the estimated accident risk 241, the biological measurement/task state data 224 corresponding thereto, the task state label 502, and a presentation content dictionary 243 in which warnings and content to be displayed are linked, to generate estimation results and information associated therewith, which are presented to the driver or a manager thereof. Below, steps S104 and S105 will be described in detail.

The accident risk estimation process (step S104) is executed when the driver is engaged in any of the tasks included among the task state labels 502 or is heading to work.

Figure 17:
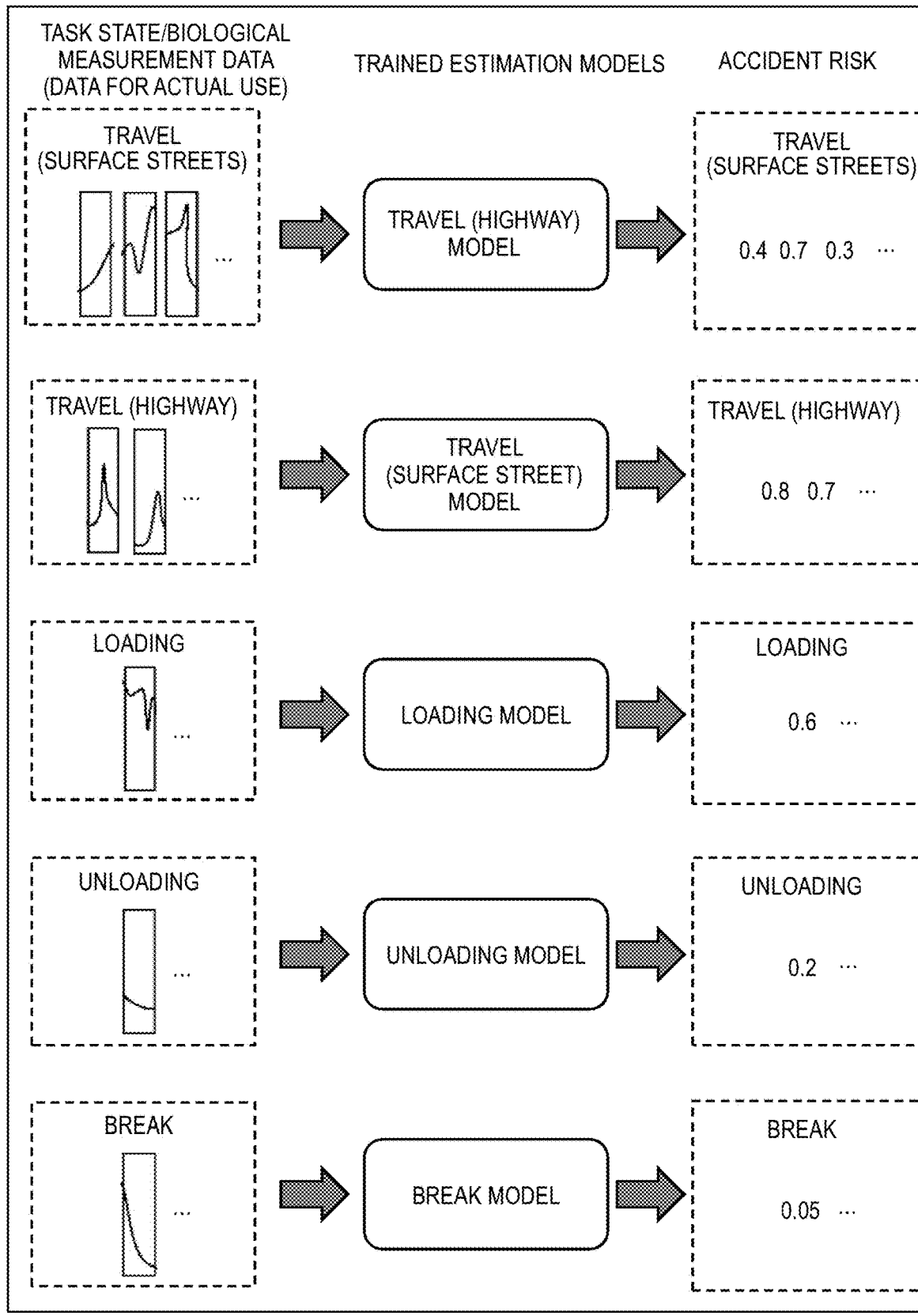
FIG. 17 is a descriptive view showing an example of the accident risk estimation process (step S104).

FIG. 17 is a descriptive view showing an example of the accident risk estimation process (step S104). The operation management aid device 2 acquires the biological measurement data 221 and the task state data 222 received in real time or at a delay of several seconds to dozens of minutes from the biological measurement data collection device 32 and the task state data collection device 33.

Also, the operation management aid device 2 acquires the biological measurement/task state data 224 generated by the biological measurement/task state label association program 213 (step S151), selects the task state labels 502 of the biological measurement/task state data 224 (step S152), selects the accident risk estimation model 225 suited to each of the selected task state labels 502 (step S152), and performs accident risk estimation (step S134).

As the estimation result, whether or not a dangerous situation occurred in the time period of the date/time 402 included in the biological measurement/task state data 224 is outputted. The estimation result may be a binary label such as "dangerous" and "not dangerous," or a continuous value corresponding to the probability of an accident occurring, the degree of severity thereof, or the like, expressed by a "degree of danger" or the like.

Figure 18:
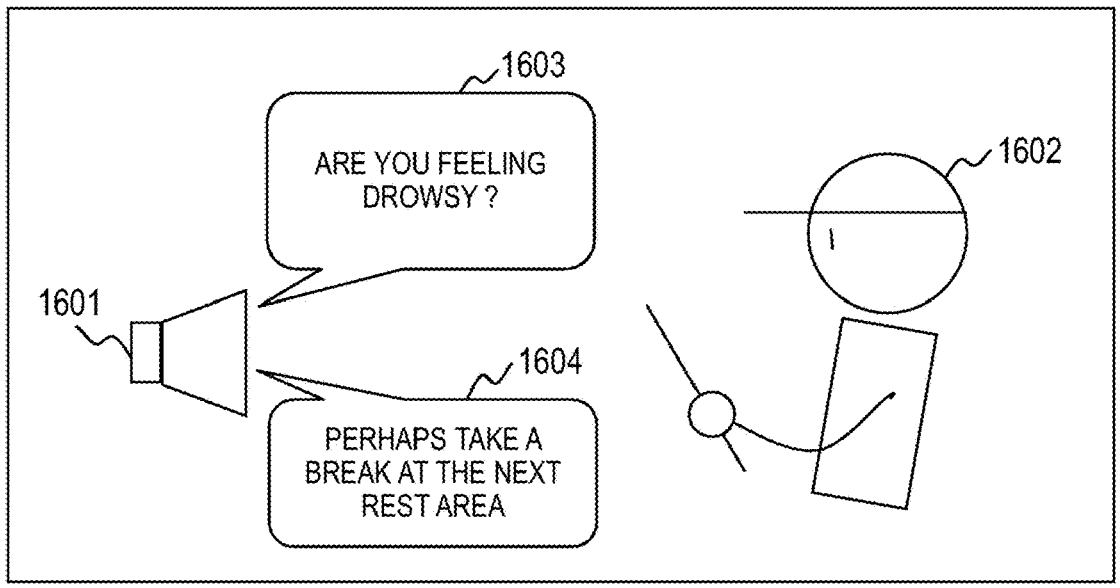
FIG. 18 is a descriptive view showing an example of feedback presented by the process of presenting the estimation result (step S105) if the estimation result indicates a "dangerous" situation or a situation corresponding thereto.

FIG. 18 is a descriptive view showing an example of feedback presented by the process of presenting the estimation result (step S105) if the estimation result indicates a "dangerous" situation or a situation corresponding thereto. A speaker or another type of alert device 1601 installed in the vehicle V issues a warning to the effect that biological measurement data 221 indicating a high accident risk has been detected.

In issuing the warning, if it is possible to estimate a state such as drowsiness, accumulated fatigue, excitement, or the like from the biological measurement data 221 and the task state label 502 with reference to the biological measurement/task state data 224 inputted to the estimation model, then the speaker or other type of alert device 1601 installed in the vehicle V may issue a call 1603 to the driver 1602 to confirm whether the driver is in such a state. Additionally, the speaker or other type of alert device 1601 installed in the vehicle V may issue a call 1604 prompting an action performable in a situation where the driver is performing a given task corresponding to each of the task state labels 502.

Figure 19:
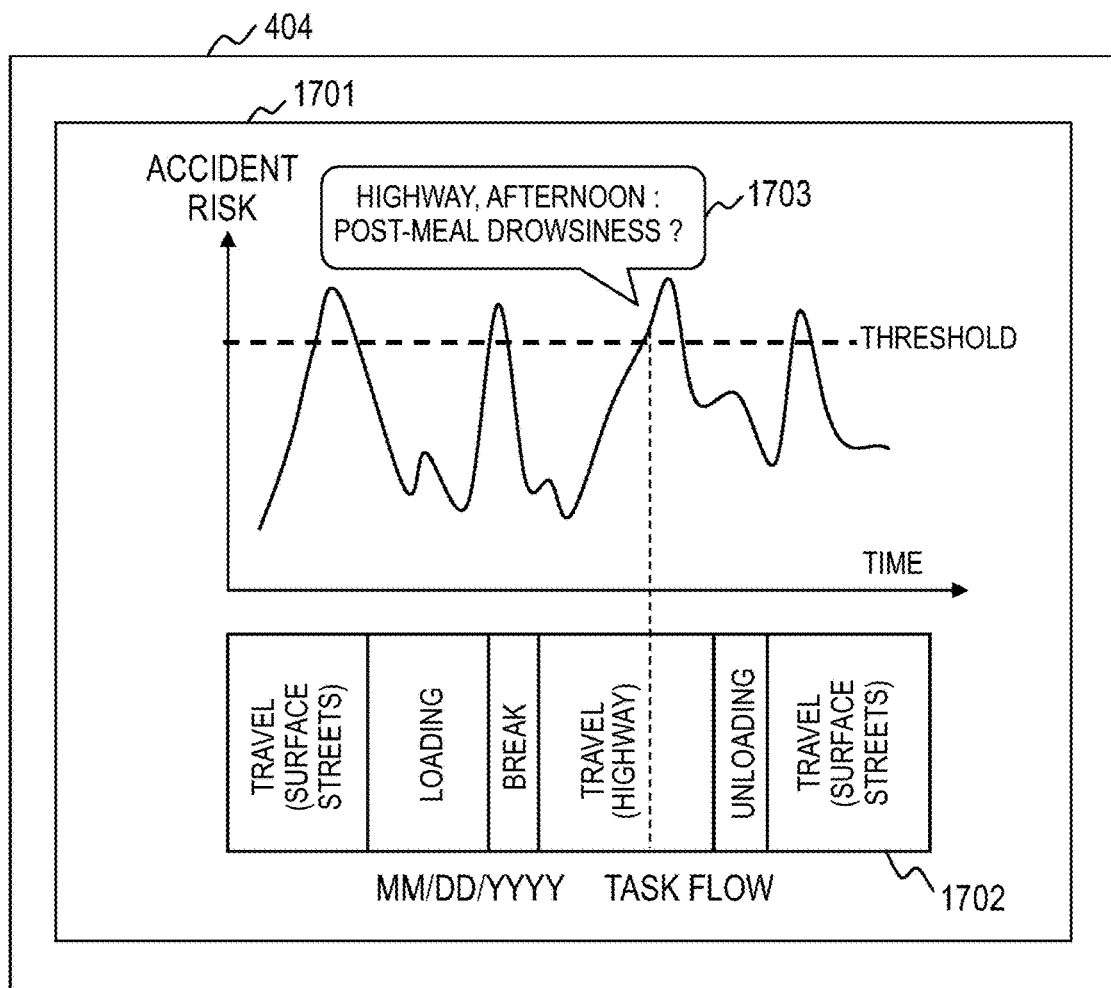
FIG. 19 is a descriptive view showing an example of feedback by which the driver or a manager can view the shift over time in the past accident risk after the end of duties of the day that the biological measurement data was acquired, or on the next day or thereafter.

FIG. 19 is a descriptive view showing an example of feedback by which the driver or a manager can view the shift over time in the past accident risk after the end of duties of the day that the biological measurement data 221 was acquired, or on the next day or thereafter. On a feedback screen 1701 of the output device 44, it is possible to confirm simultaneously the accident risk over time and a shift 1702 over time in the task state. Additionally, according to the biological measurement data 221 and the task state label 502 at a time in the past when it was recorded that the accident risk was high, a character string 1703 may be displayed indicating the type of situation or a possible candidate for the cause of the determined danger.

Thus, according to the operation management aid device 2 of the embodiment above, it is possible to estimate the accident risk corresponding to various task situations using biological data measured from a driver during duties even under measurement conditions in which a plurality of task states including driving are irregularly mixed. The present invention is not limited to use for a driver of a commercial vehicle that travels long distances such as logistics trucks or night buses, but can also be used with short-distance buses and taxis as well as trains and aircraft.

In the embodiment above, the operation management aid system 1 executes the steps S101 to S105 shown in FIG. 3, but a configuration may be adopted in which the operation management aid system 1 executes only the learning (generation of estimation model) of steps S101 to S103 and an external system executes only the accident risk estimation of steps S104 and S105. Alternatively, a configuration may be adopted in which an external system executes only the learning (generation of estimation model) of steps S101 to S103 and the operation management aid system 1 executes only the accident risk estimation of steps S104 and S105.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An operation management aid system for reducing driver accident risk, the operation management aid system comprising:

a memory that stores a first group of associated data in which biological measurement data pertaining to a biology of a driver is associated with task state data pertaining to a respective task state among a plurality of task states of the driver, and a second group of danger determination results indicating a degree of danger of driving by the driver; and a processor that is communicatively coupled to the memory, wherein the processor is configure to:

perform a first acquisition process that acquires for each of the plurality of task states, the associated data pertaining to a specific task state of the driver from the first group, and acquiring a specific danger determination result group in the specific task state of the driver from the second group, perform a generation process, using an associated data group pertaining to the specific task state and a specific danger determination result group for the specific task state, which were acquired during the first acquisition process, to generate, for each of the specific task states, an estimation model that estimates an accident risk of the driver during the specific task state, and saving the estimation model in a third group, execute an association process of associating the biological measurement data with the task state of the task state data during a same time period and for a same driver, and saving the associated data in the first group, and executes a detection process of detecting invalid data indicating behavior irrelevant to the association process, from among the biological measurement data groups split into time segments, wherein, during the association process, the processor does not perform association for the invalid data detected during the detection process wherein the first acquisition process includes:
acquiring an associated data group pertaining to the specific task state of the driver from the first group in which the associated data that was associated by the association process is saved, and wherein association process includes
splitting the biological measurement data into time segments, for each biological measurement data group split into time segments, associating therewith the task state of the task state data during the same time period and for the same driver, and saving the associated biological measurement data group and task state in the first group.

2. The operation management aid system according to claim 1,
wherein the biological measurement data is data based on a heart rate of the driver.

3. The operation management aid system according to claim 2,
wherein the data based on the heart rate of the driver is data pertaining to an autonomic nerve function of the driver.

4. The operation management aid system according to claim 1, wherein, during the detection process, if the biological measurement data is data based on a heart rate, the processor detects the invalid data from the biological measurement data group split into time segments by a heartbeat interval.

5. The operation management aid system according to claim 1,
wherein, during the detection process, the processor detects the invalid data indicating behavior based on body movement noise from the biological measurement data group split into time segments.

6. The operation management aid system according to claim 1,
wherein:
the processor is further configured to execute a setting process of setting the task state data based on at least one of an action of the driver, recording data that records the action of the driver, and a behavior of a vehicle driven by the driver, and
wherein, during the association process, the processor associates the biological measurement data with the respective task state of the task state data during the same time period and for the same driver set by the setting process, and saves the associated biological measurement data and task state in the first group.

7. The operation management aid system according to claim 1,
wherein the processor is further configured to execute:
a second acquisition process of acquiring associated data for an item subject to prediction;
a selection process of selecting, from the third group, the estimation model for a same task state as a task state included in the associated data, for the item subject to the prediction, acquired during the second acquisition process;
an estimation process of inputting the associated data for an item subject to the prediction to the estimation model selected by the selection process to estimate the accident risk of the item subject to the prediction; and
an output process of outputting an estimation result from the estimation process.

8. The operation management aid system according to claim 7,
wherein, in the output process, the processor further outputs information for alerting the driver of the estimation result.

9. The operation management aid system according to claim 7,
wherein, in the output process, the processor further outputs as the estimation result a shift in the accident risk for the item subject to the prediction and the task state included in the associated data of the item subject to the prediction, in a manner enabling display thereof.

10. An operation management aid method for reducing driver accident risk, the method comprising
storing a first group of associated data in which biological measurement data pertaining to a biology of a driver is associated with task state data pertaining to a respective task state among a plurality of task states of the driver, and a second group of danger determination results indicating a degree of danger of driving by the driver,
performing a first acquisition process that acquires, for each of the plurality of task states, the associated data pertaining to a specific task state of the driver from the first group, and acquiring a specific danger determination result group in the specific task state of the driver from the second group;

performing a generation process using an associated data group pertaining to the specific task state and the specific danger determination result group for the specific task state, which were acquired during the acquisition process, to generate an estimation model that estimates an accident risk of the driver during the specific task state, and saving the estimation model in a third group;
executing an association process of associating the biological measurement data with the task state of the task state data during a same time period and for a same driver, and saving the associated data in the first group; and
executing a detection process of detecting invalid data indicating behavior irrelevant to the association process, from among the biological measurement data groups split into time segments,
wherein, during the association process, an association for the invalid data detected during the detection process is not performed,
wherein the first acquisition process includes:
acquiring an associated data group pertaining to the specific task state of the driver from the first group in which the associated data that was associated by the association process is saved, and
wherein association process includes
splitting the biological measurement data into time segments,
for each biological measurement data group split into time segments, associating therewith the task state of the task state data during the same time period and for the same driver, and
saving the associated biological measurement data group and task state in the first group.

11. A non-transitory computer readable storage medium storing instruction for reducing driver accident risk, the instructions when executed by a processor cause the processor to perform a method comprising:
storing a first group of associated data in which biological measurement data pertaining to a biology of a driver is associated with task state data pertaining to a respective task state among a plurality of task states of the driver, and a second group of danger determination results indicating a degree of danger of driving by the driver,
performing a first acquisition process that acquires, for each of the plurality of task states, the associated data pertaining to a specific task state of the driver from the first group, and acquiring a specific danger determination result group in the specific task state of the driver from the second group;
performing a generation process using an associated data group pertaining to the specific task state and the specific danger determination result group for the specific task state, which were acquired during the acquisition process, to generate an estimation model that estimates an accident risk of the driver during the specific task state, and saving the estimation model in a third group;
executing an association process of associating the biological measurement data with the task state of the task state data during a same time period and for a same driver, and saving the associated data in the first group; and
executing a detection process of detecting invalid data indicating behavior irrelevant to the association process, from among the biological measurement data groups split into time segments, wherein, during the association process, an association for the invalid data detected during the detection process is not performed, wherein the first acquisition process includes:
acquiring an associated data group pertaining to the specific task state of the driver from the first group in which the associated data that was associated by the association process is saved, and wherein association process includes
splitting the biological measurement data into time segments,
for each biological measurement data group split into time segments, associating therewith the task state of the task state data during the same time period and for the same driver, and
saving the associated biological measurement data group and task state in the first group.

\* \* \* \* \*